June 8, 1954    C. A. POTTER    2,680,255
LAWN MOWER CLEANING TOOL
Filed June 4, 1953
FIG. 1
FIG. 2
FIG. 3
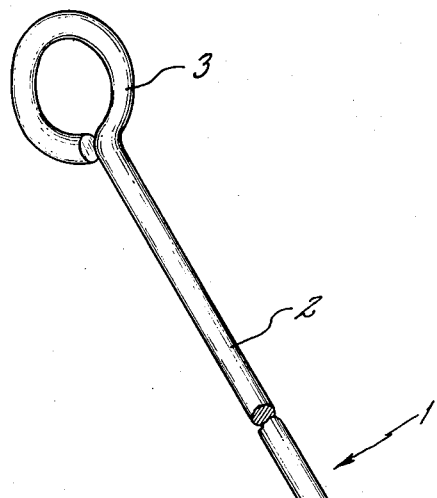
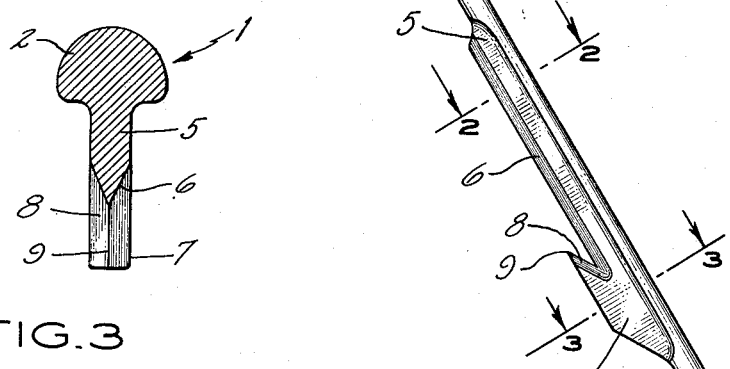
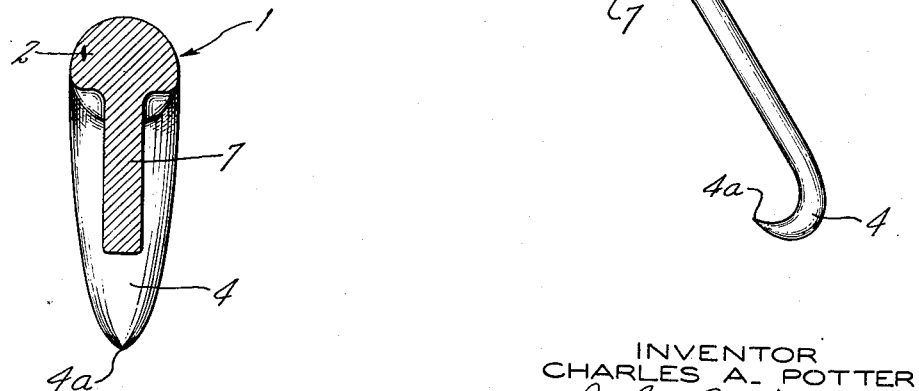
INVENTOR
CHARLES A. POTTER
BY *John B. Willard*
ATTORNEY Patented June 8, 1954

2,680,255

UNITED STATES PATENT OFFICE 2,680,255

LAWN MOWER CLEANING TOOL

Charles A. Potter, Essex, Conn.

Application June 4, 1953, Serial No. 359,513

1 Claim. (Cl. 7—14.3)

The present invention relates to improvements in tools for use in removing straw, twigs, string, wire and the like, which has become wound around the working parts of lawn mowers and similar machinery.

An object of the invention is to provide a serviceable, inexpensive tool adapted for insertion into windings of such matter on shafts and gears and for easy manipulation with a reciprocating motion to cut and remove such matter.

Other objects of the invention will be readily understood from the following description which is made with reference to the accompanying drawing in which:

Figure 1 is a view in perspective of a tool constituting a preferred embodiment of the invention; and Figs. 2 and 3 are views in transverse section taken through the tool on the lines 2—2 and 3—3, respectively, of Figure 1 and drawn to a larger scale.

Referring to the drawings, the tool, generally designated 1, has an elongate wire shank 2, at one end of which is a handle 3 and at the other end of which is a pointed curving hook 4.

The handle 3 of the illustrated embodiment is a circularly curved portion of the wire shank 2 and provides a convenient finger accommodation ring. However, a conventional screw-driver type handle of wood, plastic, or the like, may be substituted.

As shown, the hook 4 curves rearwardly with its point 4a generally located at approximately a 45° angle with the shank 2.

Rearwardly of the hook 4, the tool 1 includes a cutting blade 5 of suitable length, which is coplanar with the hook 4 and on the side of the shank 2 as the hook 4. The blade 5 has a sharp cutting edge 6 at the forward end of which is a rearwardly projecting tooth 7 which is in the plane of the blade 5 and forms an approximately 30° internal angle with the edge 6 thereof. The edge 6 is substantially parallel with the tool shank and merges with a sharpened internal edge 8 of the projecting tooth 7, the rear end of which is sharply pointed or barbed as at 9. The merging edges 6 and 8 form a cutting notch forwardly of the tooth point 9.

In using the described tool 1, the blade 5 is drawn rearwardly over the matter wound around a machine part, not shown, so that the cutting edge 6 cuts into the tangled matter. The cutting notch formed by the long and short cutting edges 6 and 8 act to wedge therebetween and cut through any windings too tough to be cut by the stroke of the long cutting blade. It is to be noted that the barbed tooth point 9 tears into the winding and limits the amount caught in the cutting notch. Thereafter, continued withdrawal causes the rounded hook 4 and its point 4a to engage and withdraw the severed windings. The tool 1 may be worked back and forth repeatedly to cause the blade edge 6 to saw and the barb 7 to catch in the winding with its cutting edge 8 and barbed point 9 severing the winding until the hook 4 has cut and pulled out all of the wound matter. Thus, a machine part may be quickly cleared and freed of straw, grass, stalks or other material.

The invention, as described, is susceptible of modification without departing from the inventive concept, and right is herein reserved to such modification as falls within the scope of the appended claim:

What I claim is:

A tool of the character described having an elongate shank, a handle at one end of said shank, a pointed hook at the other end curving rearwardly, an elongate blade rearwardly of said hook and on the same side of the shank, said blade having a cutting edge parallel with the shank, a tooth at the forward end of said cutting edge, said tooth extending outwardly and rearwardly from the shank and having a barbed end, and a cutting edge on the inner side of said tooth merging at its forward end with the forward portion of the cutting edge of the elongate blade and forming therewith a cutting notch, said tooth and blade together with their respective cutting edges and said hook all being disposed in substantially the same plane and on the same side of said shank of the tool.

No references cited.